(12) United States Patent
Vauchel

(10) Patent No.: US 9,410,502 B2
(45) Date of Patent: Aug. 9, 2016

(54) SELF-MOUNTED CASCADE FOR A THRUST REVERSER

(71) Applicant: AIRCELLE, Gonfreville l'Orcher (FR)

(72) Inventor: Guy Bernard Vauchel, Harfleur (FR)

(73) Assignee: AIRCELLE, Gonfreville l'Orcher ( * ) Notice: Subject to any disclaimer, the term of this patent is extended or adjusted under 35 U.S.C. 154(b) by 813 days.

(21) Appl. No.: 13/709,335

(22) Filed: Dec. 10, 2012

(65) Prior Publication Data
US 2013/0266423 A1 Oct. 10, 2013

Related U.S. Application Data

(63) Continuation of application No. PCT/FR2011/051259, filed on Jun. 1, 2011.

(51) Int. Cl.
*F02K 3/02* (2006.01)
*F02K 1/72* (2006.01)

(52) U.S. Cl.
CPC .. *F02K 3/025* (2013.01); *F02K 1/72* (2013.01)

(58) Field of Classification Search
CPC .............. B64C 9/34; B64C 9/36; B64C 9/38; Y02T 50/671; F02K 1/563; F02K 1/566; F02K 1/58; F02K 1/60; F02K 1/605; F02K 1/62; F02K 1/625; F02K 1/54; F02K 1/56; F02K 1/64; F02K 1/66; F02K 1/68; F02K 1/70; F02K 1/72; F02K 1/74; F02K 1/76; F02K 1/763; F02K 1/766
USPC .......... 60/226.1, 226.2, 226.3, 228, 230, 771; 239/265.13, 265.19, 265.23, 265.25, 239/265.27, 265.29, 265.31, 265.33, 239/265.35, 265.37, 265.39, 265.41, 239/265.43; 244/110 B
See application file for complete search history.

(56) References Cited

U.S. PATENT DOCUMENTS

| | | | | | |
|---|---|---|---|---|---|
| 3,262,268 | A | * | 7/1966 | Beavers | F02K 1/72 239/265.19 |
| 3,262,270 | A | * | 7/1966 | Beavers | F02K 1/72 239/265.19 |
| 3,280,562 | A | * | 10/1966 | Theits | F02K 1/72 244/52 |

(Continued)

FOREIGN PATENT DOCUMENTS

| | | | |
|---|---|---|---|
| EP | 1515035 A2 | 3/2005 | |
| EP | 1852595 A2 * | 11/2007 | ................ F02K 1/72 |

(Continued)

OTHER PUBLICATIONS

PCT/FR2011/051259 International Search Report.

*Primary Examiner* — Phutthiwat Wongwian
*Assistant Examiner* — Stefan Ibroni
(74) *Attorney, Agent, or Firm* — Burris Law, PLLC

(57) ABSTRACT

The present disclosure relates to a self-mounted cascade for a thrust reverser of an airplane jet engine nacelle. The cascade includes an upstream portion and an opposite downstream portion, along with respective connection means so that two adjacent cascades are directly connected to one another only in the respective downstream portions by downstream connection means thereof. The downstream portion corresponds to an area extending from a downstream side edge over a length less than or equal to N times the length of the last cavity located along said downstream side edge, where N is less than 3. The present disclosure is of use in the field of airplane jet engine nacelles.

16 Claims, 5 Drawing Sheets

(56) References Cited

U.S. PATENT DOCUMENTS

| | | | | |
|---|---|---|---|---|
| 3,794,246 A * | 2/1974 | Weise | ............... | F02K 1/56 239/265.33 |
| 4,026,105 A * | 5/1977 | James | ............... | F02K 1/70 239/265.29 |
| 4,030,290 A * | 6/1977 | Stachowiak | ............ | F02K 1/64 239/265.27 |
| 4,067,094 A * | 1/1978 | Ittner | ............... | B23P 15/006 239/265.29 |
| 4,137,711 A * | 2/1979 | Montgomery | ............ | F02K 1/72 239/265.31 |
| 4,278,220 A * | 7/1981 | Johnston | ............... | F02K 1/72 244/110 B |
| 4,722,821 A * | 2/1988 | Vermilye | ............ | B29C 45/14631 264/261 |
| 4,731,991 A * | 3/1988 | Newton | ............... | F02K 1/72 239/265.31 |
| 4,778,110 A * | 10/1988 | Sankey | ............... | F02K 1/605 239/265.29 |
| 4,852,805 A * | 8/1989 | Vermilye | ............ | B29C 45/14631 239/265.11 |
| 5,507,143 A * | 4/1996 | Luttgeharm | ............ | F02K 1/563 239/265.31 |
| 6,170,253 B1 * | 1/2001 | Newton | ............... | B64D 29/00 239/265.31 |
| 6,725,541 B1 * | 4/2004 | Holme | ............... | F02K 1/54 29/889.2 |
| 7,484,355 B2 | 2/2009 | Blin et al. | | |
| 7,484,356 B1 | 2/2009 | Lair | | |
| 2001/0009642 A1 * | 7/2001 | Holme | ............... | F02K 1/54 415/198.1 |
| 2009/0314887 A1 * | 12/2009 | Aten | ............... | F02K 1/625 244/110 B |
| 2012/0036716 A1 * | 2/2012 | Urban | ............... | F02K 1/72 29/889 |
| 2012/0272637 A1 * | 11/2012 | Holland | ............ | B29C 63/34 60/226.2 |
| 2014/0154064 A1 * | 6/2014 | Bouteiller | ............ | F02K 1/566 415/182.1 |

FOREIGN PATENT DOCUMENTS

| | | |
|---|---|---|
| EP | 2138697 A2 | 12/2009 |
| FR | 2849113 A1 | 6/2004 |
| RU | 2 145 672 C1 | 10/2000 |

\* cited by examiner

SELF-MOUNTED CASCADE FOR A THRUST REVERSER

CROSS-REFERENCE TO RELATED APPLICATIONS

This application is a continuation of International Application No. PCT/FR2011/051259 filed on Jun. 1, 2011, which claims the benefit of FR 10/54473, filed on Jun. 8, 2010. The disclosures of the above applications are incorporated herein by reference.

FIELD

The present disclosure relates to a self-mounted cascade for a thrust reverser of an airplane turbojet engine nacelle.

It also relates to a cascade assembly and an airplane turbojet engine nacelle comprising such an assembly.

BACKGROUND

The statements in this section merely provide background information related to the present disclosure and may not constitute prior art.

An airplane is moved by several turbojet engines each housed in a nacelle also housing a set of related actuating devices connected to its operation and performing various functions when the turbojet engine is running or stopped. These related actuating devices in particular include a mechanical thrust reversal system.

As illustrated in FIG. 1, a nacelle generally has a tubular structure comprising an air intake 2 upstream of the turbojet engine, a middle structure 3 designed to surround a fan of the turbojet engine, a downstream section 4 housing thrust reverser means (also called thrust reverser) and designed to surround the combustion chamber of the turbojet engine, and generally ends with a jet nozzle 5 whereof the outlet is situated downstream of the turbojet engine.

Modern nacelles are designed to house a dual flow turbojet engine capable of generating, via the rotating fan blades, a hot air flow (also called primary flow) coming from the combustion chamber of the turbojet engine, and a cold air flow (secondary flow) that circulates outside the turbojet engine through an annular channel 6, also called a duct, formed between a fairing 7 of the turbojet engine and an inner wall 8 of the nacelle. The two flows of air are ejected from the turbojet engine through the rear of the nacelle. The two flows of air are ejected from the turbojet engine through the rear of the nacelle.

The role of a thrust reverse device is, during landing of an airplane, to improve the braking capacity thereof by reorienting at least part of the thrust generated by the turbojet engine forward. In that phase, the reverser obstructs the cold air flow, and orients that flow toward the front of the nacelle, thereby generating a counter-thrust that is added to the braking of the wheels of the airplane.

The means implemented to perform this reorientation of the cold flow vary depending on the type of reverser. However, in all cases, the structure of a reverser comprises moving parts that can be moved between a deployed (or "reverse jet") position, in which they open a passage in the nacelle designed for the diverted flow on the one hand, and a retracted (or "direct jet") position, in which they close that passage on the other hand.

FIGS. 2 and 3 illustrate a traditional cascade vane thrust reverser 40, also known as a cascade reverser, in which the reorientation of the air flow is done by cascade vanes 41, the cowl 42 being slidingly mounted along the axis A of the nacelle so as to expose or cover said vanes 41. Complementary blocking doors 43, also called reverser flaps, activated by the sliding of the cowling, generally allow closing of the annular cold air flow (secondary flow) channel 6 downstream of the vanes 41 so as to optimize the reorientation of that air flow.

This type of cascade thrust reverser 40 is arranged downstream of the fan case 30 of a dual flow turbojet engine, and its associated fan cowl 31. This reverser 40 has at least one moving cowl 42 having an outer panel 420 and an inner panel 421 (or inner diaphragm) designed to delimit, in a direct jet position of the turbojet engine (FIG. 2), an outer wall of the annular channel 6 in which the secondary flow flows, the reverser 40 having at least one reverser flap 43 hingedly mounted on the inner wall 421 of the moving cowl 42 and actuated by at least one connecting rod 45 during the movement of the moving cowl 42 in the downstream direction, such that, in a thrust reversal or reverse jet position (FIG. 3), each blocking door 43 has an area extending in the annular channel 6 so as to deflect at least part of the secondary flow outside said annular channel 6.

This thrust reverser 40 has a plurality of cascade vanes 41, fastened between the front peripheral frame 46 and a stationary rear peripheral frame 47 that generally join the outer panel 420 and the inner panel 421 of the moving cowl 42 between them. During operation, the reorientation of the secondary flow, in the reverse jet position, is done by said cascade vanes 41, the moving cowl 42 primarily having a sliding function aiming to expose or cover said cascade vanes 41, the translation of the moving cowl 42 being done along a longitudinal axis substantially parallel to the axis A of the nacelle 1. A housing 48 is provided in the moving cowl 42 and makes it possible to house the cascade vanes 41 when the thrust reverser 40 is not actuated, i.e. in the direct jet position, as shown in FIG. 2.

The sliding of the moving cowl 42 between its direct jet and reverse jet positions is ensured by cylinders (not shown) distributed on the periphery of the nacelle. Traditionally, these cylinders are fastened upstream on a stationary part of the nacelle, such as the upstream front support frame 46 of the cascade vanes 41, and downstream inside the moving cowl 42, by means of adapted fittings.

More specifically, the actuating rods of said cylinders pass through the downstream rear support frame 47 of the cascade vanes 41 to cooperate with the moving cowl 42. This necessarily means that the upstream rear support frame 47 of the cascade vanes 41 has a certain radial bulk. Furthermore, the vanes 41, in reverse mode or reverse jet position, undergo major aerodynamic loads that tend to cause the downstream portions of the vanes 41 fastened on the peripheral groove frame 47 to emerge outward. The height (or thickness) of the rear frame 47 is advantageously larger than that of the vanes 41 so as to provide the best possible inertia for the vane assembly 41.

In standard thrust reverser structures 40, the thickness of the aerodynamic lines is sufficient to have an adapted inertia of the vane assembly 41 and to be able to pass through the rear frame 47 using the cylinder rod to reach the fastener of the moving cowl 42 downstream of the rear frame 47. To return to the current inertia, the structure of the rear frame 47 is festooned at the opening, increasing the height of the rear frame proportionately.

However, in modern nacelles, where efforts are made to reduce aerodynamic losses due to wet surfaces, the lines are increasingly close together, and it is in particular therefore important to be able to reduce the radial thickness of the rear frame, or even to be able to completely eliminate the rear frame. In fact, it is often more possible to house the rear frame having openings in the moving cowl, the total thickness of the cowl no longer being sufficient to house the entire architecture of the thrust reverser in the nacelle.

To respond to this problem of eliminating the rear frame in cascade thrust reversers, it is known, in particular from patent applications EP 1 852 595 A2 and EP 1 515 035 A2, to use a self-mounted cascade assembly, also called self-mounted cascades, i.e. an assembly of cascades only fastened to each other and to the front frame, with no rear frame.

FIGS. 4 to 6 illustrate one known example of a self-mounted cascade assembly 51. As illustrated in FIG. 4, the thrust reversers 50 with self-mounted cascades 51 have an assembly of several self-mounted cascades 51 that makes it possible to achieve a flexible arrangement of the driving of the reverser layers. The self-mounted cascades 51 are distributed on the periphery of the downstream portion of a peripheral front frame 56 and may form an assembly that may contain up to twelve cascades per half-side of the reverser 50, such as for example for self-mounted cascades 51 per half-side in the example of FIG. 4.

The multiplicity of the self-mounted cascades 51 allows very flexible driving of the reverser layers and makes it possible to use a specific blading configuration in several positions, this ultimately making it possible to control the overall cost of producing the reverser function using cascade vanes.

As shown in FIG. 5, which illustrates a detail of FIG. 4, each self-mounted cascade 51 is provided with a plurality of cells and has two opposite openwork front surfaces, in this case an upper front surface 510 situated toward the outside across from the outer panel 420 of the moving cowl 42, and a lower front surface 511 situated toward the inside across from the inner wall 421 of the moving cowl 42.

As shown in FIG. 6, which illustrates an assembly of two self-mounted cascades 51, each self-mounted cascade 51 has an upstream portion 512 (sometimes called front portion) fastened on the front frame 56 and an opposite downstream portion 513 (sometimes called rear portion) that is free, i.e. that is not fastened to a rear frame. Furthermore, each self-mounted cascade 51 has two opposite side edges extending over the entire width of the self-mounted cascade 51, i.e. an upstream side edge 514 situated in the upstream portion 512 and a downstream side edge 515 situated in the downstream portion 513; the side edges 514, 515 of the self-mounted cascades 51 form the circumferential, or peripheral, edges of the cascade assembly 51 situated in the thrust reverser 50, extending in a bowed manner around the axis A of the nacelle.

Each self-mounted cascade 51 also has two opposite transverse edges 516 extending over the entire length of the self-mounted cascade 51; the transverse edges 516 of the self-mounted cascades 51 form junction edges between the self-mounted cascades 51 of the cascade assembly situated in the thrust reverser 50, said transverse edges 516 extending substantially parallel to the axis A of the nacelle.

To be assembled to one another, each self-mounted cascade 51 has two strips of material 517, substantially parallel to the front surfaces 510, 511, positioned on the two transverse edges 516 and extending over substantially the entire length of the self-mounted cascade 51. In this way, the adjacent strips of material 517 of two adjacent self-mounted cascades 51 overlap one another and are fastened to one another by fastening screws 518. In this way, in this assembly, the self-mounted cascades 51 are fastened to one another over substantially the entire length thereof.

The main drawback of this type of assembly is that it has solid strips of material 517 at successive intervals, between the cascades 51 over substantially the entire length of the cascades 51, thereby limiting the deflection function of the cold air flow by limiting the surface area of the openwork surfaces.

Since the cross-section of the self-mounted cascades 51 should be substantially equal to the section of the annular channel 6, in other words the cold air duct, it is important for the loss of cross-section due to this connection of the self-mounted cascades 51 to one another to be offset by an increased length of said self-mounted cascades 51.

However, the Applicant has noted in practice that excessively long self-mounted cascades 51 do not efficiently deflect the cold air flow in their downstream portions 513. In fact, the longer the self-mounted cascade 51, the less air effectively passes through all of the cells (or blades) of the cascade, with the result that the efficiency of the deflection (and therefore breaking) is reduced during thrust reversal.

Thus, the management of the layers of the reversal flow is more delicate to manage with an assembly of several self-mounted cascades 51; the flexibility obtained by using several individual cascades assembled to one another is lost with this increased length, and each self-mounted cascade 51 cannot be reused on another peripheral sector of the thrust reverser 50. Ultimately, the cost of this assembly of self-mounted cascades 51 then becomes higher than that of using individual cascades.

SUMMARY

The present disclosure provides a self-mounted cascade, and an assembly of such self-mounted cascades, that makes it possible to limit the passage cross-section loss and the length of the self-mounted cascade, in other words to assemble cascade vanes without adding a rear frame and while minimizing the passage cross-section loss so as to minimize the length of the cascades.

The present disclosure also provides a self-mounted cascade that makes it possible to assemble approximately a dozen cascades per half-side of the thrust reverser so as to be able to optimize the output direction of the reversal flow, in other words to allow very flexible driving of the reverser layers and thereby make it possible to use a specific blading configuration in several positions, in particular with the aim of limiting the overall cost of the cascade assembly and the reverser function.

To that end, it proposes a self-mounted cascade vane for a cascade thrust reverser for an airplane turbojet engine nacelle, said cascade vane being provided with a plurality of cells with two opposite openwork front surfaces, having, on the one hand:
  two opposite side edges extending over the width of the cascade, i.e. an upstream side edge situated in an upstream portion and a downstream side edge situated in a downstream portion;
  two opposite transverse edges extending over the length of the cascade, i.e. a first transverse edge and a second transverse edge;
  and, on the other hand, having:
  upstream fastening means formed on the upstream side edge and designed to fasten the cascade on a stationary structure of the nacelle, such as a front frame structure; and
  first and second connecting means formed on the first and second transverse edges, respectively, to connect the cascade to two adjacent cascades situated on the thrust reverser;

the cascade being remarkable in that the first and second connecting means, called first and second downstream connecting means, are arranged only on the downstream portion of the cascade, said downstream portion corresponding to an area extending from the downstream side edge over a length smaller than or equal to N times the length of the last cell situated along said downstream side edge, where N is less than 3 and preferably less than or equal to 1.

Thus, the present disclosure proposes only connecting the self-mounted cascades to one another directly in their respective downstream portions, in other words over a connecting link not taking up more than three rows of cells, and not over substantially the entire length of the cascades, as already known from the state of the art. Of course, the self-mounted cascades are connected to one another in their upstream portions via the stationary structure of the nacelle.

In this way, a cascade assembly according to the invention will have, at the interface between the cascades, connecting means between the cascades only in the downstream portion, over at most three rows of cells, thereby limiting the negative impact of those connecting means on the deflection of the secondary flow. Each cascade therefore does not have any connecting means with one or more adjacent cascades in the upstream portion thereof and in the central portion thereof (situated between the upstream portion and the downstream portion which extends over the entire length of the cascade decreased by at most three rows of cells), such that the cascade assembly will generally have an openwork and continuous surface in the upstream portion and central portion thereof, with no solid surface. Only the downstream portion of the assembly will have a solid surface, due to the presence of the downstream connecting means between the cascades. In this way, this cascade makes it possible to minimize the passage cross-section loss while making it possible to minimize the length of the cascade.

According to the present disclosure, the downstream connecting means are positioned only in the downstream portion of the cascade and therefore do not extend into the central portion and upstream portion of the cascade.

The downstream portion of the cascade corresponds to an area extending along the downstream side edge of the cascade and extending at most at a distance from said downstream side edge smaller than or equal to N times the length of the last cell situated along said downstream side edge, where N is less than 3 and preferably less than or equal to 1. In other words, the first and second downstream connecting means extend lengthwise, from the downstream side edge, over at most the last three rows of cells situated on the side of the downstream side edge, and preferably over at most the last row of cells.

In this way, the downstream connecting means do not extend further than the last three rows of cells situated in the downstream portion of the cascade, or preferably no further than the last row of cells situated in the downstream portion of the cascade, thereby having a low impact on the overall surface area of openwork surfaces of the assembly and therefore the deflection function. It is also possible to consider the downstream connecting means extending lengthwise (along the length over the cascade) over less than one cell, in other words extending lengthwise over only a portion of the last cell, and not the entirety thereof.

Within the meaning of the present disclosure, the length corresponds to a dimension considered in the longitudinal direction of the cascade, said longitudinal direction being parallel to the axis A of the nacelle situated on the thrust reverser and extending from the upstream side edge as far as the downstream side edge of the cascade.

Within the meaning of the present disclosure, the downstream side edge of the cascade extends over the width of the cascade, in the downstream portion, and partially defines the downstream circumferential or peripheral edge of the cascade assembly extending in a bowed manner around the axis of the nacelle, situated in the thrust reverser; this downstream circumferential or peripheral edge of the cascade assembly being free and not supported by a rear frame, since the cascades are of the self-mounted type.

Likewise, within the meaning of the present disclosure, the upstream side edge of the cascade extends over the width of the cascade, in the upstream portion of the side of the upstream stationary support structure of the cascade, and partially defines the upstream circumferential or peripheral edge of the cascade assembly extending in a bowed manner around the axis of the nacelle, situated in the thrust reverser.

Within the meaning of the present disclosure, the width corresponds to a dimension considered in the lateral direction of the cascade, this lateral direction being substantially normal to the longitudinal direction of the cascade and the axis A of the nacelle situated on the thrust reverser and extending between the two transverse edges of the upstream side edge as far as the downstream side edge of the cascade.

The connecting means may assume the form of connecting tabs that extend in the downstream portion of the cascade, and more specifically in the downstream corners of the cascade, so as to overlap the connecting pads of the adjacent cascades.

Different alternatives may potentially be considered alone or in combination: tabs superimposed like tiles, situated at least partially overlapping the last downstream cell of the cascade and/or situated in the extension of the downstream edge of the cascade.

According to a first feature, at least one of the first and second downstream connecting means is positioned partially withdrawn from the concerned transverse edge.

This feature is advantageous so that the downstream connection between two cascades is done withdrawn from the junction plane between the two adjacent transverse edges of the two cascades, to ultimately obtain two cascades joined edge to edge with said two substantially joined transverse edges, so that the cells of one cascade are extended with no discontinuity by the cells of the other cascade on either side of said junction plane between the two transverse edges.

Advantageously, one of the first and second downstream connecting means is positioned partially withdrawn relative to the concerned transverse edge toward the inside of the cascade, and the other of the first and second downstream connecting means is positioned partially withdrawn relative to the concerned transverse edge toward the outside of the cascade.

In this way, a first downstream connecting means of a cascade cooperates with a second downstream connecting means of another cascade, and such cooperation is done withdrawn from the junction plane between the two adjacent transverse edges of the two cascades, since the outer (or protruding) withdrawn connecting means may cooperate with the other downstream connecting means that is inwardly withdrawn relative thereto.

In one advantageous form, one of the first and second downstream connecting means has at least one passage opening for a fastening member situated withdrawn relative to the concerned transverse edge toward the inside of the cascade, while the other of the first and second downstream connecting means has at least one passage opening for a fastening member situated withdrawn relative to the concerned transverse edge toward the outside of the cascade.

In this way, a first downstream connecting means of one cascade cooperates with a second downstream connecting means of another cascade, and this cooperation is done withdrawn from the junction plane between the two adjacent transverse edges of the two cascades, since the inner withdrawn opening may coincide with the other inner withdrawn opening for the passage of a fastening member in those two openings.

According to one possibility the present disclosure, the first downstream connecting means has at least one first connecting tab and the second downstream connecting means has at least one second connecting tab.

In this way, the connection between two adjacent cascades will be done by overlapping and cooperation of at least one first connecting tab of a cascade with at least one second connecting tab of the other cascade.

In this way, a cascade may be assembled with two adjacent cascades using the first and second connecting tabs. Likewise, a peripheral cascade may be assembled to a structural element of the thrust reverser framing the cascade assembly, for example such as a beam situated in the upper portion of the nacelle (at 12 o'clock), and which would have a complementary connecting tab for receiving one of the connecting tabs of the peripheral cascade adjacent to that structural element.

In a first form, the first downstream connecting means has at least one first front connecting tab and the second downstream connecting means has at least one second front connecting tab, each front connecting tab extending substantially parallel to the openwork front surfaces of the cascade.

In this way, said first front connecting tab is designed to overlap a second front connecting tab of an adjacent cascade so as to make it possible to connect the two cascades.

Each front connecting tab is preferably provided with at least one passage opening for a fastening member, and potentially with at least one passage opening for a centering member.

According to one feature, the first front connecting tab is arranged in a first downstream corner of the cascade and is situated at least partially overlapping a cell situated in said first downstream corner, and the second front connecting tab is arranged in a second downstream corner of the cascade, opposite the first downstream corner, and is situated at least partially overlapping a cell situated in said second downstream corner.

Within the meaning of the present disclosure, "downstream corner of the cascade" refers to the protruding corner space formed in the downstream portion by two edges of the cascade, in this case the downstream side edge and one of the two transverse edges of the cascade.

Within the meaning of the present disclosure, as a reminder, "transverse edges of the cascade" refers to the opposite edges that extend over the length of the cascade and that form the junction edges between the cascades of the cascade assembly situated in the thrust reverser, said transverse edges extending substantially parallel to the axis of the nacelle.

In this first form, the present disclosure also relates to the following features:
the second front connecting tab is offset relative to the first front connecting tab, in a direction substantially normal to the openwork front surfaces of the cascade, so as to overlap a first front connecting tab of an identical adjacent cascade, and in that case the cascade assembly may have only identical cascades according to the invention; or alternatively
the second front connecting tab is substantially coplanar with the first front connecting tab, so as to overlap a first front connecting tab of an adjacent cascade, and in that case the cascade assembly has first cascades connected to second cascades alternating between first and second cascades.

According to one possibility of the present disclosure, the first front connecting tab is level with one of the two openwork front surfaces of the cascade, preferably the upper front surface of the cascade designed to be situated toward the outside situated on the thrust reverser, while the second front connecting tab is withdrawn relative to said front surface of the cascade in a direction substantially normal to the openwork front surfaces of the cascade.

According to another possibility of the invention, the first front support tab and the second front support tab are withdrawn relative to the two openwork front surfaces of the cascade in a direction substantially normal to the openwork front surfaces of the cascade.

In a second form (which may be considered alone or in combination with the first embodiment), the first downstream connecting means has at least one first side connecting tab and the second downstream connecting means has at least one second side connecting tab, each side connecting tab extending substantially parallel to the downstream side edge.

Each side connecting tab is preferably provided with at least one passage opening for a fastening member, and potentially with at least one passage opening for a centering member.

In this way, said first side connecting tab is designed to overlap a second side connecting tab of an adjacent cascade so as to allow the connection between the two cascades.

According to a first possibility, the second side connecting tab is offset relative to the first side connecting tab, in a direction substantially normal to the downstream side edge of the cascade, so as to overlap a first side connecting tab of a similar adjacent cascade.

According to a second possibility, the second side connecting tab is coplanar with the first side connecting tab, so as to overlap a first side connecting tab of a separate adjacent cascade.

According to another feature, the first side connecting tab and/or the second side connecting tab has:
an upper wall substantially parallel to and coplanar with an upper front surface of the cascade, so as to bear against an upper edge of the complementary front tab with which said tab will cooperate to provide the connection; and/or
a lower wall substantially parallel to and coplanar with a lower front surface of the cascade, so as to bear against a lower edge of the complementary front tab with which said tab will cooperate to provide the connection.

The present disclosure also relates to a cascade assembly for a cascade thrust reverser, having at least one first, second, and third successive cascades according to the invention, in which:
the first cascade is connected to the second cascade by complementary cooperation between the first downstream connecting means formed on the first transverse edge of the first cascade and the second downstream connecting means formed on the second transverse edge of the second cascade, the first transverse edge of the first cascade being substantially joined with the second transverse edge of the second cascade outside the area where said downstream connecting means are formed; and
the second cascade is connected to the third cascade by complementary cooperation between the first downstream connecting means formed on the first transverse edge of the second cascade and the second downstream connecting means formed on the second transverse edge of the third cascade, the first transverse edge of the second cascade being substantially joined to the second transverse edge of the third cascade outside the area where said downstream connecting means are formed.

The present disclosure also relates to an airplane turbojet engine nacelle having a cascade thrust reverser equipped with at least one assembly according to the invention, where the cascades of the assembly are fastened in the upstream portions thereof, with their respective upstream fastening means, on a stationary structure of the nacelle such as a front frame structure, and where the cascades of the assembly are directly connected to one another only in their respective downstream portions by their downstream connecting means.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings.

Other features and advantages of the present disclosure will appear upon reading the following detailed description of three non-limiting example embodiments, done in reference to the appended figures, in which:

FIG. 1, already discussed, is a longitudinal cross-sectional view of a already discussed, is a longitudinal cross-sectional view of an airplane turbojet engine nacelle;

FIGS. 2 and 3, already discussed, are partial longitudinal cross-sectional diagrammatic views of a traditional cascade thrust reverser, in the reverse jet and direct jet positions, respectively;

FIG. 4, already discussed, is a diagrammatic transverse cross-sectional view of a known thrust reverser equipped with a self-mounted cascade assembly;

FIG. 5, already discussed, is an enlarged view of zone V of FIG. 4;

FIG. 6, already discussed, is a diagrammatic perspective view of two self-mounted cascades equipping the thrust reverser illustrated in FIG. 4;

Figure 1:
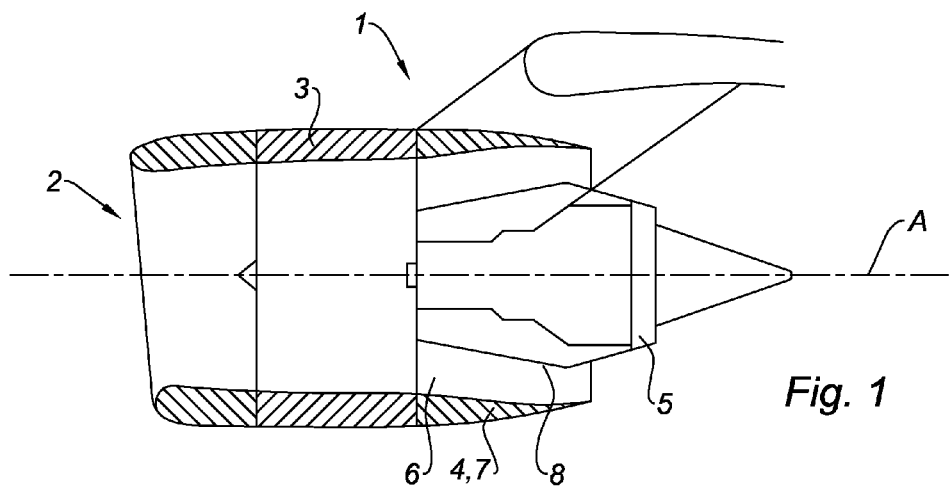
Figure 2:
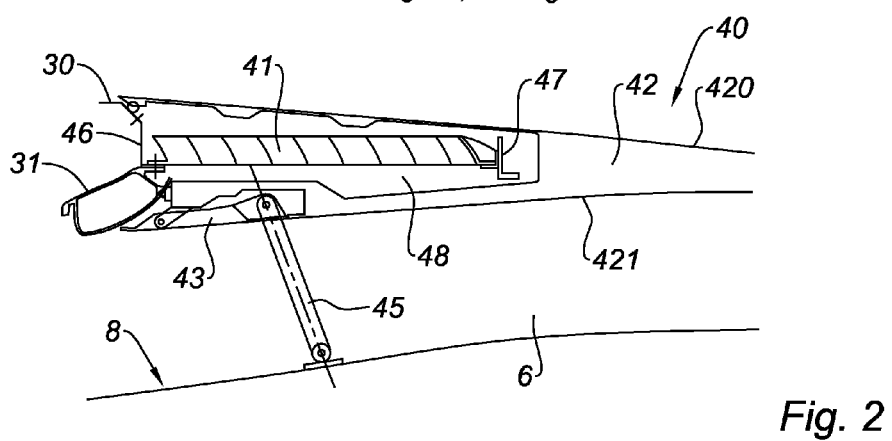
Figure 3:
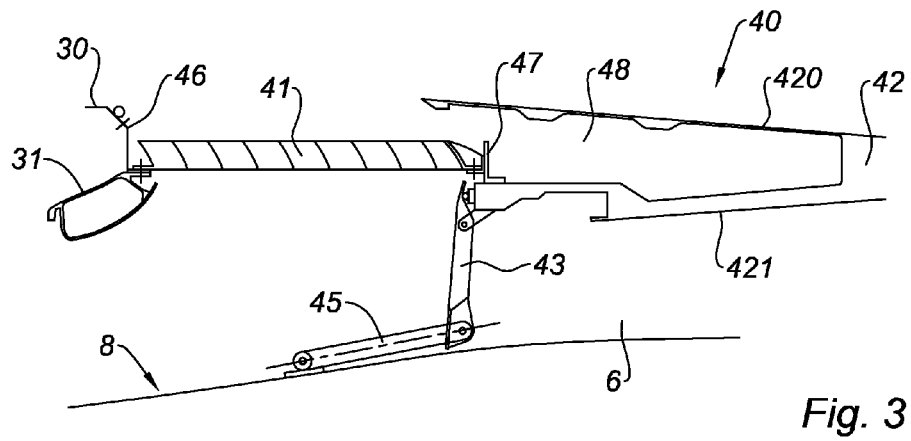
Figure 5:
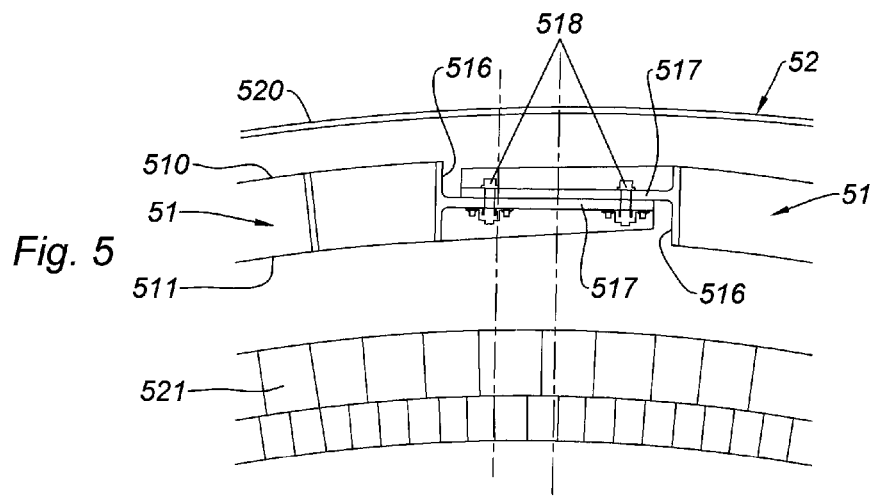
Figure 4:
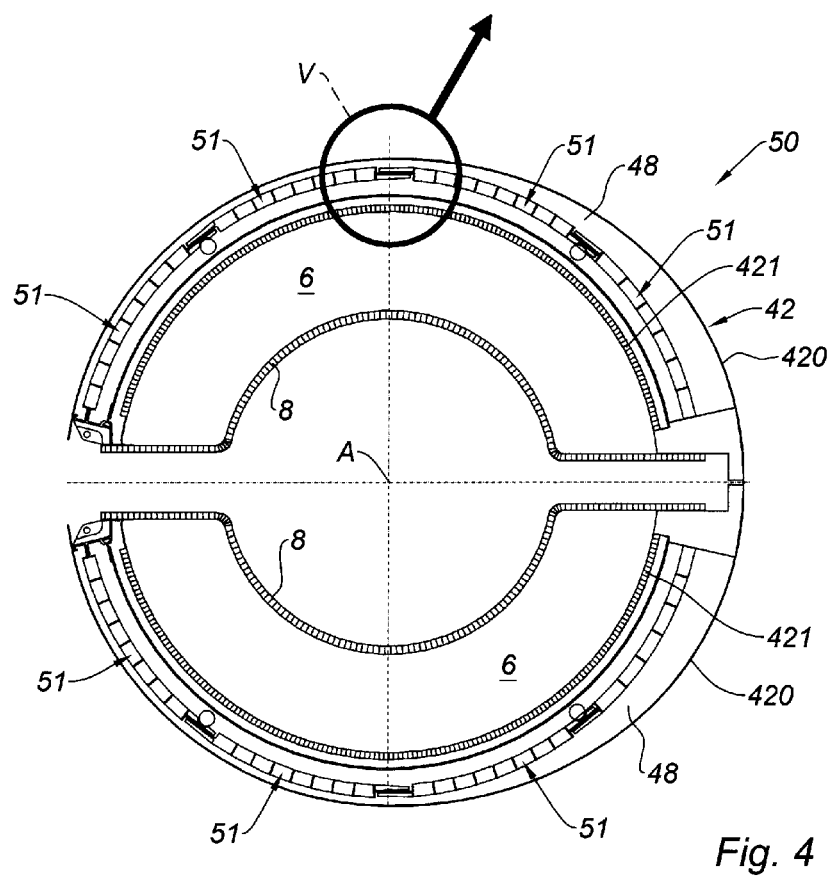
Figure 6:
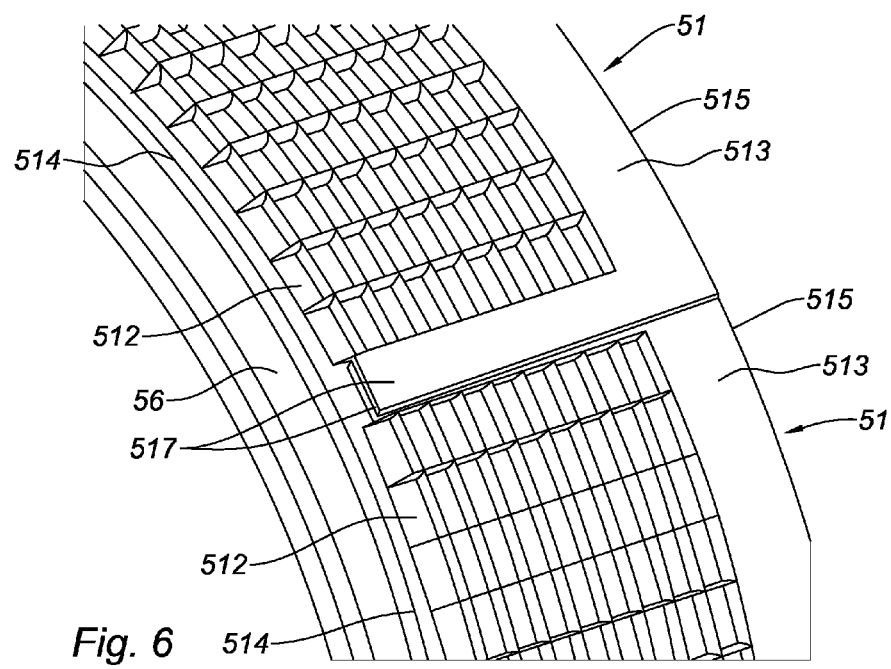

In all of these figures, identical or similar references designate identical or similar members or sets of members.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 7:
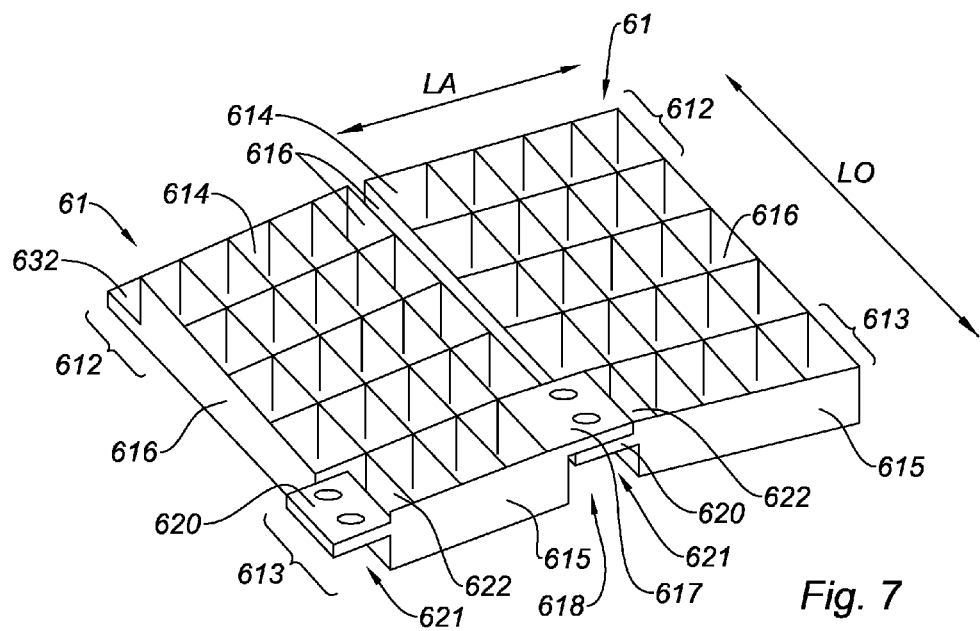
FIG. 7 is a diagrammatic perspective view of two cascades according to a first form and assembled to one another.
Figure 8:
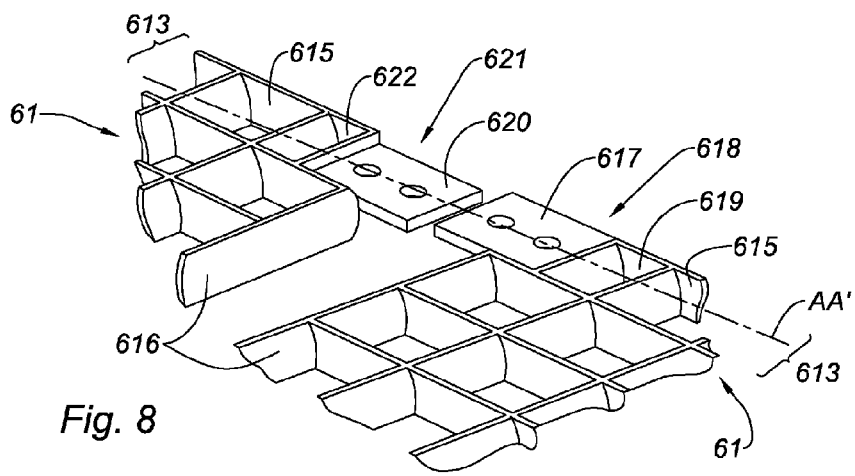
FIG. 8 is a diagrammatic and partial perspective view of two cascades according to the first form before being assembled to one another.

FIGS. 7 to 9 illustrate assemblies of self-mounted cascades 61 according to a first embodiment of the invention.

Figure 9A:
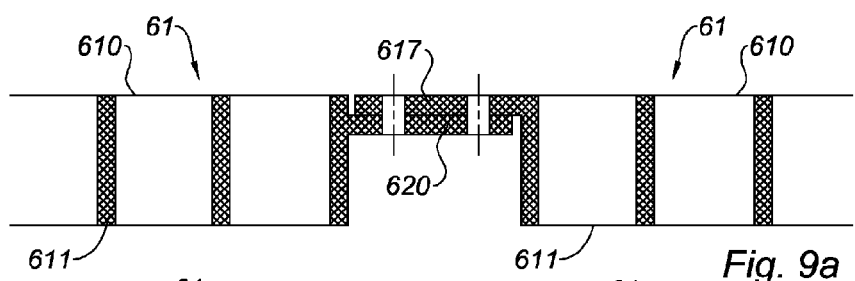
FIG. 9a is a diagrammatic cross-sectional view along line AA' of the two cascades of FIG. 8 once they are assembled to one another.
Figure 9B:
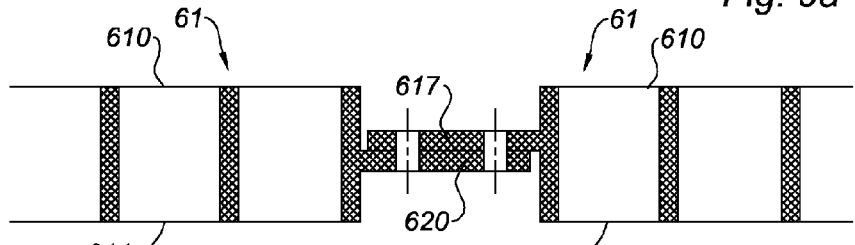
FIG. 9b is a diagrammatic cross-sectional view, identical to that of FIG. 9a, of two assembled cascades according to the first form.
Figure 9C:
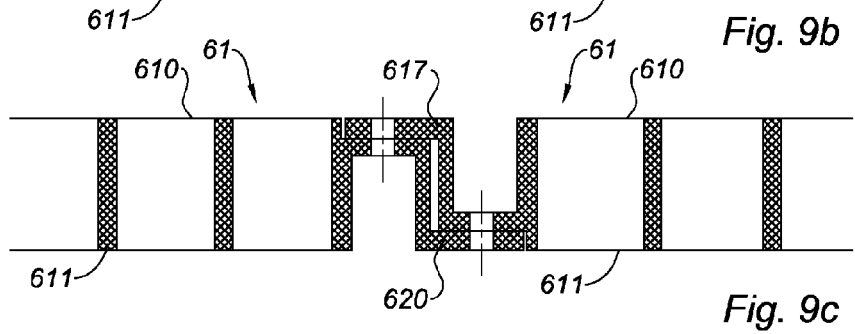
FIG. 9c is a diagrammatic cross-sectional view, identical to that of FIG. 9a, of two assembled cascades according to the first form.

Each cascade 61 is provided with a plurality of cells and has two opposite openwork front surfaces, in this case an upper front surface 610 and a lower front surface 611 visible in FIGS. 9a to 9c.

Each cascade 61 has an upstream portion 612 designed to be fastened on a front frame (not shown) and a free opposite downstream portion 613, i.e. not fastened to a rear frame.

Furthermore, each cascade 61 has two opposite side edges extending over the entire width LA of the cascade 61, i.e. an upstream side edge 614 situated in the upstream portion 612 and a downstream side edge 615 situated in the downstream portion 613; the side edges 614, 615 of the cascades 61 forming the circumferential, or peripheral, edges of the cascade assembly 61 situated in the thrust reverser, and extending in a bowed manner around the axis of the nacelle.

To fasten the upstream portion 612 of the cascade 61 on the front frame, said upstream portion 612 has a fastening wall 632 on the front frame, said fastening wall 632 extending parallel to the front surfaces 610, 611 protruding from the upstream side edge 614, along the first row of cells. This fastening wall 632 thus forms a cornice that will bear against the front frame so as to be able to be fastened thereon.

The downstream portion 613 of the cascade 61 corresponds to an area extending along the downstream side edge 615 of the cascade 61 and extending at most at a distance from said downstream side edge 615 smaller than the length of the last three rows of cells (in this case, smaller than the length of the last row of cells) situated along said downstream side edge 615.

Each cascade 61 also has two opposite transverse edges 616 extending over the entire length LO of the cascade 61; the transverse edges 616 of the cascades 61 form a junction edge between the cascade 61 of the cascade assembly situated in the thrust reverser, said transverse edges 616 extending substantially parallel to the axis of the nacelle.

To assemble these two cascades 61, one of the cascades 61 (that on the left in FIG. 7 or on the right in FIGS. 8 and 9) has a first front connecting tab 617 positioned in the downstream portion 613, provided with a passage opening for a fastening member and potentially with a passage opening for a centering member, and which extends substantially coplanar to the openwork front surfaces 610, 611 of the cascade 61. This first front connecting tab 617 does not extend lengthwise any further than the last row cells situated in the downstream portion 613 of the cascade 61.

More specifically, said first front connecting tab 617 is positioned in a first downstream corner 618 of the cascade 61, in the downstream portion 613 of the cascade 61, and is situated at least partially overlapping the last cell 619 situated in said first downstream corner 618. It should be noted that the opposite overlap may also be applied.

To assemble these two cascades 61, the other cascade 61 (that on the right in FIG. 7 or the left to FIGS. 8 and 9) has a second front connecting tab 620 positioned in the downstream portion 613, provided with a passage opening for a fastening member and potentially with the passage opening for a centering member, which extends substantially coplanar to the openwork front surfaces 610, 611 of the cascade 61. The second front connecting tab 620 does not extend lengthwise any further than the last row of cells situated in the downstream portion 613 of the cascade 61.

More specifically, this second front connecting tab 620 is positioned in a second downstream corner 621 of the cascade 61, opposite the first downstream corner 618 of that same cascade 61, and is situated at least partially overlapping the last cell 622 situated in said second downstream corner 621.

The second front connecting tab 620 of the cascade 61 on the left is offset relative to the first front connecting tab 617 of the cascade 61 on the right, in a direction substantially normal to the openwork front surfaces 610, 611 of the cascades 61, so as to overlap one another, so as to have the openings formed in said front connecting tabs 617, 620 coincide to engage the fastening and centering members that will finalize the assembly between the two cascades 61. The assembly is therefore done by positioning the front connecting tabs 617, 620 one over the other.

In FIG. 7, one can see that the openings of the first front connecting tab 617 are situated withdrawn relative to the concerned transverse edge 616 toward the outside of the cascade, while the openings of the second front connecting tab 620 are situated withdrawn relative to the concerned transverse edge 616 toward the inside of the cascade 61, to allow those two transverse edges 616 to be substantially joined. The same is true in FIG. 8, with openings withdrawn relative to the concerned transverse edges.

The front connecting tabs 617, 620 exceed the transverse edges 616 to allow the adjacent transverse edges 616 of two adjacent cascades 61 to be positioned substantially one against the other, with assembly clearance. More specifically, the front connecting tabs 617, 620 overhang the concerned transverse edges by approximately half their width (dimension considered in the direction of the width LA of the cascade 61). In other words, it will be noted that:

the first front connecting tab 617 has a withdrawn portion relative to the concerned transverse edge 616 toward the inside of the cascade 61 (in this case, the portion situated in the last corner cell 619), and a portion withdrawn relative to the concerned transverse edge 616 toward the outside of the cascade 61 (in this case, its free end, which exceeds or protrudes outside the transverse edge 616); and the second front connecting tab 620 has a withdrawn portion relative to the concerned transverse edge 616 toward the inside of the cascade 61 (in this case, the portion situated in the last corner cell 622), and a withdrawn portion relative to the concerned transverse edge 616 toward the outside of the cascade 61 (in this case, its free edge, which exceeds or protrudes outside the transverse edge 616).

The or each cascade 61 (on the left in FIG. 7) may have both a first front connecting tab 617 and a second front connecting tab 620 of the same type as those described above so as to make it possible to assemble the cascade 61 with two identical or similar adjacent cascades. Within a same cascade 61, the second front connecting tab 620 of the cascade 61 may be is offset relative to the first front connecting tab 617 of that same cascade 61, in a direction substantially normal to the openwork front surfaces 610, 611 of the cascade 61, so that said second front connecting tab 620 can overlap a first front connecting tab 617 of an identical adjacent cascade 61.

In one alternative not shown, within a same cascade, the second front connecting tab is substantially coplanar with the first front connecting tab, such that it is necessary for assembly to use different first and second cascades (at least in the localization of the front connecting tabs), alternating between first and second cascades.

In the examples of FIGS. 7, 8 and 9a, the first front connecting tab 617 is level with the upper front surface 610 of the cascade 61, while the second front connecting tab 620 is withdrawn relative to the upper front surface 610 of the cascade 61.

In the example of FIG. 9b, the first front connecting tab 617 and the second front connecting tab 620 are withdrawn relative to the two openwork front surfaces 610, 611 of the cascade 61. In this way, depending on the desired load distribution on the cascades, the front connecting tabs 617, 620 may be positioned differently in the thickness of the cascade.

In the example of FIG. 9c, the first front connecting tab 617 and the second front connecting tab 620 are stair-stepped and each have, on the one hand, a base withdrawn from one of the front surfaces 610, 611 of the concerned cascade 61 and, on the other hand, a free end that is level with the other front surface 610, 611 of the adjacent cascade 61.

Figure 10A:
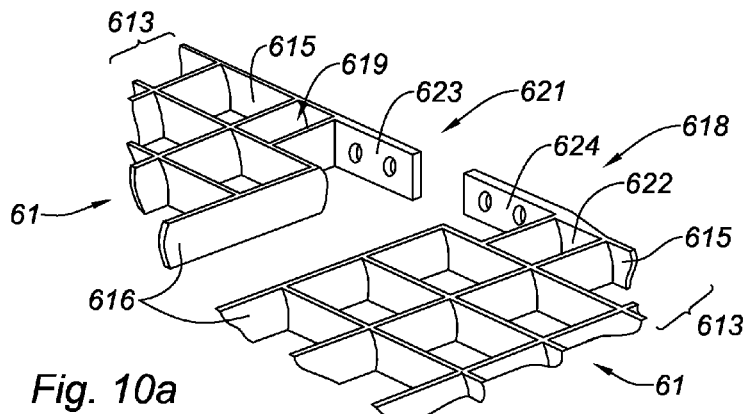
FIG. 10a is a partial diagrammatic perspective view of two cascades according to a second embodiment before they are assembled to one another.
Figure 10B:
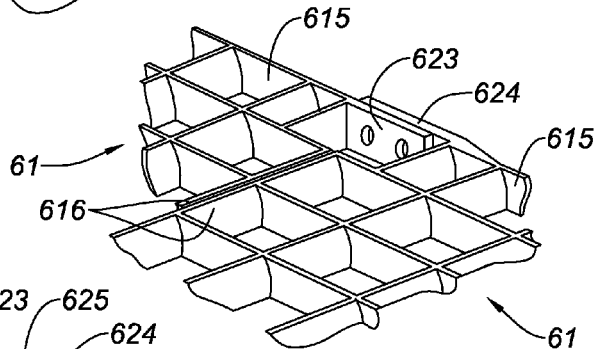
FIG. 10b is a partial diagrammatic perspective view of the two cascades of FIG. 10a once they are assembled to one another.
Figure 11:
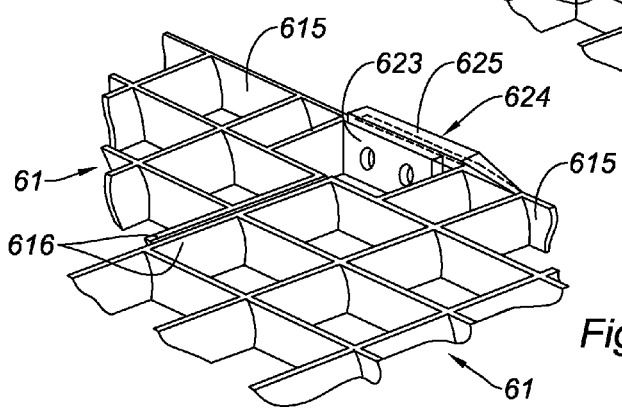
FIG. 11 is a partial diagrammatic perspective view of two cascades according to the second embodiment and assembled to one another.

FIGS. 10 and 11 illustrate self-mounted cascade assemblies 61 according to a second embodiment of the invention. These cascades 61 are of the same type as those described above for the first embodiment, with the exception of the downstream connecting means used to connect the downstream portions 613 of two adjacent cascades 61 to one another.

To assemble two cascades 61 to one another, one of the cascades 61 (on the left in FIGS. 10 and 11) has a first side connecting tab 623 positioned in the downstream portion 613, provided with passage openings for a fastening member and possibly with a passage opening for a center member, and which extends substantially orthogonally to the openwork front surfaces 610, 611 of the cascade 61. This first side connecting tab 623 extends substantially parallel to the downstream side edge 615 of the cascade 61, coplanar to that downstream side edge 615.

More specifically, this first side connecting tab 623 is positioned in the first downstream corner 618 of the cascade 61 and is situated at least partially overlapping the last cell 619 situated at first downstream corner 618.

To assemble these two cascades 61, the other cascade 61 (on the right in FIGS. 10 and 11) has a second side connecting tab 624 positioned in the downstream portion 613, provided with a passage opening for a fastening member and potentially with a passage opening for a centering member, and which extends substantially orthogonally to the openwork front surfaces 610, 611 of the cascade 61. This second side connecting tab 624 extends substantially parallel to the downstream side edge 615 of the cascade 61, in an offset manner relative to said downstream side edge 615.

More specifically, this second side connecting tab 624 is positioned in the second downstream corner 621 of the cascade 61, opposite the first downstream corner 618 of that same cascade 61, and is situated at least partially overlapping the last cell 622 situated in that second downstream corner 621.

The second side connecting tab 624 of the right cascade 61 is offset relative to the first side connecting tab 623 of the cascade 61 on the left, in a direction substantially normal to the downstream side edges 615 of the cascades 61, so as to overlap one another, so as to have the openings formed in said side connecting tabs 623, 624 coincide in order to engage the fastening and centering members that will finalize the assembly between the two cascades 61. The assembly is therefore done by positioning the side connecting tabs 623, 624 one on the other.

It will be noted that the two openings of the first side connecting tab 623 are situated withdrawn relative to the concerned transverse edge 616 respectively toward the inside and the outside of the cascade 61, and that the openings of the second side connecting tab 624 are situated withdrawn relative to the concerned transverse edge 616 toward the outside and toward the inside of the cascade 61, respectively, to allow those two transverse edges 616 to be substantially joined.

The side connecting tabs 623, 624 exceed the transverse edges 616, to allow the adjacent transverse edges 616 of two adjacent cascades 61 to be substantially one against the other, with assembly clearance. More specifically, the side connecting tabs 623, 624 overhang the concerned transverse edges 616 by approximately half their width (dimension considered in the direction of the width LA of the cascade 61). In other words, it will be noted that:

- the first side connecting tab 623 has a withdrawn portion relative to the concerned transverse edge 616 toward the inside of the cascade 61 (in this case, the portion situated in the last corner cell 619), and a portion withdrawn relative to the concerned transverse edge 616 toward the outside of the cascade 61 (in this case, its free end that exceeds or protrudes outside the transverse edge 616); and
- the second side connecting tab 624 has a withdrawn portion relative to the concerned transverse edge 616 toward the inside of the cascade 61 (in this case, the portion situated in the last corner cell 622), and a portion withdrawn relative to the concerned transverse edge 616 toward the outside of the cascade 61 (in this case, its free end that exceeds or protrudes outside the transverse edge 616).

The or each cascade 61 may have both a first side connecting tab 623 and a second side connecting tab 624 of the same type as those described above so as to make it possible to assemble the cascade 61 with two identical or similar adjacent cascades. Within a same cascade 61, the second side connecting tab 624 of the cascade 61 may be is offset relative to the downstream side edge 615, while the first side connecting tab 623 of that same cascade 61 is substantially coplanar to said downstream side edge 615, such that said second side connecting tab 624 can overlap a first side connecting tab 623 of an identical adjacent cascades 61.

In an alternative that is not shown, within a same cascade, the first side connecting tab and the second side connecting tab are both coplanar, or then both offset, relative to the downstream side edge, such that it is necessary, for assembly, to use different first and second cascades (at least in the localization of the side connecting tabs), alternating between first and second cascades.

In an improvement illustrated in FIG. 11, the second side connecting tab 624 has an upper wall 625 that is substantially parallel to or coplanar with the upper front wall 610 of the cascade 61, so as to bear against the upper edge of the first side connecting tab 623 of the adjacent cascade 61, thereby strengthening the connection between the two cascades 61. Alternatively or complementarily, the second side connecting tab 624 has a lower wall (not shown) substantially parallel to or coplanar with the lower front surface 611 of the cascade 61, so as to bear against the lower edge of the first side connecting tab 623 of the adjacent cascade 61.

In one alternative not shown, the first side connecting tab has an upper wall and/or a lower wall substantially parallel to and coplanar with the upper and lower front surfaces of the cascade, respectively, so as to bear against the upper and lower edges, respectively, of the second side connecting tab.

Figure 12:
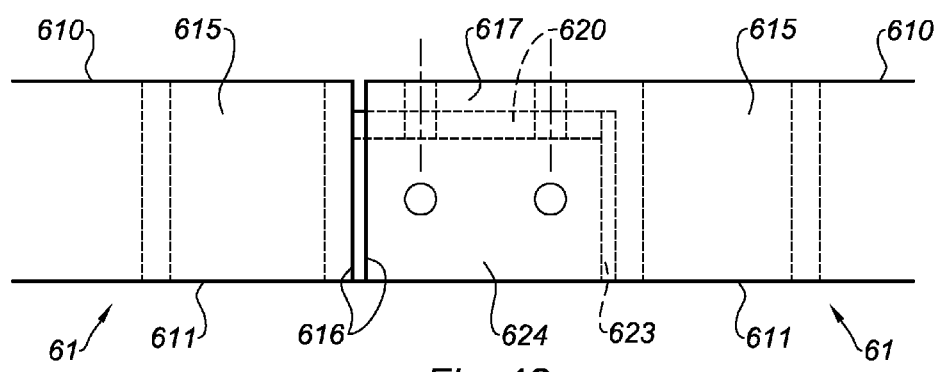
FIG. 12 is a diagrammatic side view of two assembled cascades according to a third embodiment resulting from the combination of the first and second embodiments.

FIG. 12 shows a self-mounted cascade assembly 61 according to a third embodiment of the invention resulting from the combination of the first and second embodiments. In this third embodiment, the cascade 61 has both front connecting tabs 617, 620 and side connecting tabs 623, 624 to provide the connection between two adjacent cascades 61; these connecting tabs 617, 620, 623, 624 are in accordance with the preceding description.

Of course, the example forms described above are in no way limiting, and other improvements and details may be added to the cascade according to the present disclosure, without going beyond the scope of the invention, where other forms of downstream connecting means and/or connecting tabs may for example be used.

What is claimed is:

1. A self-mounted cascade vane for a cascade thrust reverser for an airplane turbojet engine nacelle, said cascade vane being provided with a plurality of cells with two opposite openwork front surfaces, having:
    two opposite side edges extending over a width of the cascade vane, with an upstream side edge situated in an upstream portion and a downstream side edge situated in a downstream portion;
    two opposite transverse edges extending over a length of the cascade, with a first transverse edge and a second transverse edge;
    an upstream fastening device formed on the upstream side edge and designed to fasten the cascade vane on a stationary structure of the nacelle; and
    first and second connecting devices formed on the two opposite transverse edges, respectively, to connect the cascade vane to two adjacent cascades situated on the cascade thrust reverser;
    wherein the first and second connecting devices are arranged only on the downstream portion of the cascade vane to directly connect the cascade vane to the two adjacent cascades only in the downstream portion at the first and second connecting devices, said downstream portion corresponding to an area extending from the downstream side edge over a length smaller than or equal to N times the length of the last cell situated along said downstream side edge, where N is less than 3.

2. The cascade vane according to claim 1, wherein at least one of the first and second downstream connecting devices is positioned partially withdrawn from its respective transverse edge.

3. The cascade vane according to claim 2, wherein one of the first and second downstream connecting devices is positioned partially withdrawn relative to its respective transverse edge toward the inside of the cascade, and the other of the first and second downstream connecting devices is positioned partially withdrawn relative to its respective transverse edge toward the outside of the cascade.

4. The cascade vane according to claim 1, wherein one of the first and second downstream connecting devices has at least one passage opening for a fastening member situated withdrawn relative to its respective transverse edge toward the inside of the cascade, while the other of the first and second downstream connecting devices has at least one passage opening for a fastening member situated withdrawn relative to its respective transverse edge toward the outside of the cascade.

5. The cascade vane according to claim 1, wherein the first downstream connecting device has at least one first connecting tab and the second downstream connecting device has at least one second connecting tab.

6. The cascade vane according to claim 5, wherein the first downstream connecting device has at least one first front connecting tab and the second downstream connecting device has at least one second front connecting tab, each front connecting tab extending substantially parallel to the openwork front surfaces of the cascade vane.

7. The cascade vane according to claim 6, wherein the first front connecting tab is arranged in a first downstream corner of the cascade vane and is situated at least partially overlapping a cell situated in said first downstream corner, and the second front connecting tab is arranged in a second downstream corner of the cascade vane, opposite the first downstream corner, and is situated at least partially overlapping a cell situated in said second downstream corner.

8. The cascade vane according to claim 6, wherein the first front connecting tab is level with one of the two openwork front surfaces of the cascade vane, while the second front connecting tab is withdrawn relative to said front surface of the cascade vane in a direction substantially normal to the openwork front surfaces of the cascade vane.

9. The cascade vane according to claim 6, wherein the first front support tab and the second front support tab are withdrawn relative to the two openwork front surfaces of the cascade vane in a direction substantially normal to the openwork front surfaces of the cascade vane.

10. The cascade vane according to claim 5, wherein the first downstream connecting device has at least one first side connecting tab and the second downstream connecting device has at least one second side connecting tab, each side connecting tab extending substantially parallel to the downstream side edge.

11. The cascade vane according to claim 10, wherein the first side connecting tab is arranged in a first downstream corner of the cascade vane, coplanar or offset relative to said downstream side edge, and the second side connecting tab is arranged in a second downstream corner of the cascade vane, opposite the first downstream corner.

12. The cascade vane according to claim 10, wherein at least one of the first side connecting tab and the second side connecting tab has at least one of:
an upper wall substantially parallel to and coplanar with an upper front surface of the cascade vane, and
a lower wall substantially parallel to and coplanar with a lower front surface of the cascade vane.

13. A cascade assembly for a cascade thrust reverser, having at least one first, second, and third successive cascade vane according to claim 1, in which:
the first cascade vane is connected to the second cascade vane by complementary cooperation between the first downstream connecting device formed on the first transverse edge of the first cascade vane and the second downstream connecting device formed on the second transverse edge of the second cascade vane, the first transverse edge of the first cascade vane being substantially joined with the second transverse edge of the second cascade vane outside the area where said downstream connecting device is formed; and
the second cascade vane is connected to the third cascade vane by complementary cooperation between the first downstream connecting device formed on the first transverse edge of the second cascade vane and the second downstream connecting device formed on the second transverse edge of the third cascade vane, the first transverse edge of the second cascade vane being substantially joined to the second transverse edge of the third cascade vane outside the area where said downstream connecting device is formed.

14. An airplane turbojet engine nacelle having a cascade thrust reverser equipped with at least one assembly according to claim 13, where the cascade vanes of the assembly are fastened in the upstream portions thereof, with their respective upstream fastening means.

15. The cascade vane according to claim 1, wherein where N is less than or equal to 1.

16. The cascade vane according to claim 8, wherein the first front connecting tab is level with the upper front surface of the cascade vane.

* * * * *